United States Patent
Turtinen et al.

(10) Patent No.: US 11,382,138 B2
(45) Date of Patent: Jul. 5, 2022

(54) RANDOM ACCESS IN COMMUNICATION SYSTEM

(71) Applicant: Nokia Technologies Oy, Espoo (FI)

(72) Inventors: Samuli Heikki Turtinen, Ii (FI); Chunli Wu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/838,672

(22) Filed: Apr. 2, 2020

(65) Prior Publication Data
US 2021/0100034 A1    Apr. 1, 2021

(30) Foreign Application Priority Data

Sep. 30, 2019   (WO) ................ PCT/CN2019/109628

(51) Int. Cl.
*H04W 74/08* (2009.01)
*H04B 17/318* (2015.01)
(Continued)

(52) U.S. Cl.
CPC ...... *H04W 74/0833* (2013.01); *H04B 17/318* (2015.01); *H04W 72/046* (2013.01); *H04W 74/02* (2013.01)

(58) Field of Classification Search
CPC ........... H04W 74/0833; H04W 72/046; H04W 74/02; H04W 74/0841; H04W 74/085; H04W 74/0858; H04W 74/0866; H04W 74/0875; H04B 17/318; H04B 17/336; H04B 17/382
See application file for complete search history.

(56) References Cited

U.S. PATENT DOCUMENTS

| | | | |
|---|---|---|---|
| 2010/0182992 A1* | 7/2010 | Chun ................ | H04W 56/0005 370/350 |
| 2011/0098052 A1* | 4/2011 | Jung ................... | H04W 72/005 455/450 |

(Continued)

FOREIGN PATENT DOCUMENTS

| | | |
|---|---|---|
| CN | 109644326 A | 4/2019 |
| WO | 2018135640 A1 | 7/2018 |

OTHER PUBLICATIONS

"Revised Work Item Proposal: 2-Step RACH for NR", 3GPP TSG RAN Meeting #83, RP-190711, Agenda: 9.4.7, ZTE Corporation, Mar. 18-21, 2019, 4 pages.

(Continued)

*Primary Examiner* — Dinh Nguyen
(74) *Attorney, Agent, or Firm* — Harrington & Smith

(57) ABSTRACT

Embodiments of the present disclosure relate to random access in a communication system. A first device receives a criterion to select a random access type for performing random access to a second device. The first device further determines whether the first device is allocated a contention-free random access resource for a certain random access type, and then performs the random access to the second device based on the determination and conditionally based on the criterion. As such, in the case where contention-free random access resource has been allocated for a certain random access type, the device can conditionally apply the criterion for selection of the random access type and can thus perform random access with improved efficiency.

16 Claims, 6 Drawing Sheets

(51) Int. Cl.
*H04W 72/04* (2009.01)
*H04W 74/02* (2009.01)

(56) References Cited

U.S. PATENT DOCUMENTS

| | | | |
|---|---|---|---|
| 2012/0184306 A1* | 7/2012 | Zou | H04W 74/0833 455/458 |
| 2013/0021952 A1* | 1/2013 | Jeong | H04W 72/046 370/277 |
| 2016/0050667 A1* | 2/2016 | Papasakellariou | H04L 1/1822 370/329 |
| 2016/0302119 A1* | 10/2016 | Chen | H04W 76/23 |
| 2018/0110074 A1 | 4/2018 | Akkarakaran et al. | |
| 2018/0124830 A1* | 5/2018 | Lin | H04W 8/005 |
| 2018/0324653 A1* | 11/2018 | Nagaraja | H04W 36/0044 |
| 2019/0082334 A1* | 3/2019 | Nagaraja | H04W 72/1226 |
| 2019/0261411 A1 | 8/2019 | Chin et al. | 74/2 |
| 2019/0349838 A1* | 11/2019 | Futaki | H04W 88/02 |
| 2020/0252990 A1* | 8/2020 | Ganesan | H04W 76/19 |
| 2020/0373992 A1* | 11/2020 | Wang | H04B 7/0626 |
| 2021/0022180 A1* | 1/2021 | Lei | H04W 56/0045 |

OTHER PUBLICATIONS

"3rd Generation Partnership Project; Technical Specification Group Radio Access Network; NR; Medium Access Control (MAC) protocol specification (Release 15)", 3GPP TS 38.321, V15.6.0, Jun. 2019, pp. 1-78.

"3rd Generation Partnership Project; Technical Specification Group Radio Access Network; NR; Physical layer procedures for data (Release 15)", 3GPP TS 38.214, V15.6.0, Jun. 2019, pp. 1-105.

"3rd Generation Partnership Project; Technical Specification Group Radio Access Network; NR; Radio Resource Control (RRC) protocol specification (Release 15)", 3GPP TS 38.331, V15.6.0, Jun. 2019, pp. 1-519.

"3rd Generation Partnership Project; Technical Specification Group Radio Access Network; NR; NR and NG-RAN Overall Description; Stage 2 (Release 15)", 3GPP TS 38.300, V15.6.0, Jun. 2019, pp. 1-99.

"3rd Generation Partnership Project; Technical Specification Group Radio Access Network; NR; Requirements for support of radio resource management (Release 16)", 3GPP TS 38.133, V16.0.0, Jun. 2019, pp. 1-1001.

International Search Report and Written Opinion received for corresponding Patent Cooperation Treaty Application No. PCT/CN2019/109628, dated Jun. 30, 2020, 9 pages.

"Remaining Details of RACH Procedure", 3GPP TSG RAN WG1 Meeting #92, R1-1801410, Agenda : 7.1.4.2, ZTE, Feb. 26-Mar. 2, 2018, 12 pages.

"Corrections on PRACH Procedure", 3GPP TSG RAN WG1 Meeting #93, R1-1806705, Agenda : 7.1.1.4.2, Samsung, May 21-25, 2018, 8 pages.

"RACH type switching between 2-steps, 4-steps RACH and CFRA", Huawei, HiSilicon, 3GPP TSG-RAN WG2 Meeting 106, R2-1907733, May 2019, 7 pages.

"Feature lead summary#1 on 2 step RACH procedures", Nokia, Nokia Shanghai Bel, 3GPP TSG RAN WG1 #97, RI-1909499, Aug. 2019, 55 pages.

"Selection of 2-step or 4-step RA", Ericsson, 3GPP TSG-RAN WG2 #107, R2-1909937, Aug. 2019, 2 pages.

"Backoff for two-step random access", Huawei, HiSilicon, 3GPP TSG-RAN WG2 Meeting 106, R2-1907734, May 2019, 4 pages.

* cited by examiner

RANDOM ACCESS IN COMMUNICATION SYSTEM

FIELD

Embodiments of the present disclosure generally relate to the field of telecommunication and in particular, to methods, devices, apparatuses and computer readable storage medium for random access in a communication system.

BACKGROUND

Various wireless communication systems have been developed and are being developed to meet an increasing demand for communication services. Prior to receiving communication service from a wireless communication system, a terminal device has to establish a connection with a network.

A random access (RA) procedure refers to a procedure for a terminal device to establish or reestablish a connection with a network device such as an Evolved NodeB (eNB). Either contention-free random access (CFRA) or contention-based random access (CBRA) can be employed to perform the RA procedure. CFRA refers to the use of dedicated RA resources while CBRA refers to the use of shared RA resources. Once the connection has been established and/or reestablished, the network device can assign resources to a particular terminal device in support of further communication with the network device.

SUMMARY

In general, example embodiments of the present disclosure provide a solution for random access.

In a first aspect, there is provided a first device. The first device comprises at least one processor; and at least one memory including computer program code; where the at least one memory and the computer program code are configured to, with the at least one processor, cause the first device to detect that a criterion to select a first random access type for performing random access to a second device is met, determine whether the first device is allowed to use a contention-free random access resource allocated for a second random access type if the criterion to select the first random access type is met, and perform the random access to the second device based on the determination.

In a second aspect, there is provided a second device. The second device comprises at least one processor; and at least one memory including computer program code; where the at least one memory and the computer program code are configured to, with the at least one processor, cause the second device to provide indication information for a first device, the indication information indicating whether the first device is allowed to use a contention-free random access resource allocated for a second random access type if a criterion to select a first random access type for performing random access to the second device is met, and perform the random access with the first device.

In a third aspect, there is provided a method. The method comprises detecting that a criterion to select a first random access type for performing random access to a second device is met; determining whether the first device is allowed to use a contention-free random access resource allocated for a second random access type if the criterion to select the first random access type is met; and performing the random access to the second device based on the determination.

In a fourth aspect, there is provided a method. The method comprises providing indication information for a first device, the indication information indicating whether the first device is allowed to use a contention-free random access resource allocated for a second random access type if a criterion to select a first random access type for performing random access to the second device is met; and performing the random access with the first device.

In a fifth aspect, there is provided a first apparatus. The first apparatus comprises means for detecting that a criterion to select a first random access type for performing random access to a second apparatus is met; determining whether the first apparatus is allowed to use a contention-free random access resource allocated for a second random access type if the criterion to select the first random access type is met; and performing the random access to the second apparatus based on the determination.

In a sixth aspect, there is provided a second apparatus. The second apparatus comprises means for providing indication information for a first apparatus, the indication information indicating whether the first apparatus is allowed to use a contention-free random access resource allocated for a second random access type if a criterion to select a first random access type for performing random access to the second apparatus is met; and means for performing the random access with the first apparatus.

In a seventh aspect, there is provided a computer readable medium. The computer readable medium comprises program instructions for causing an apparatus to perform at least the method according to any one of the above third and fourth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
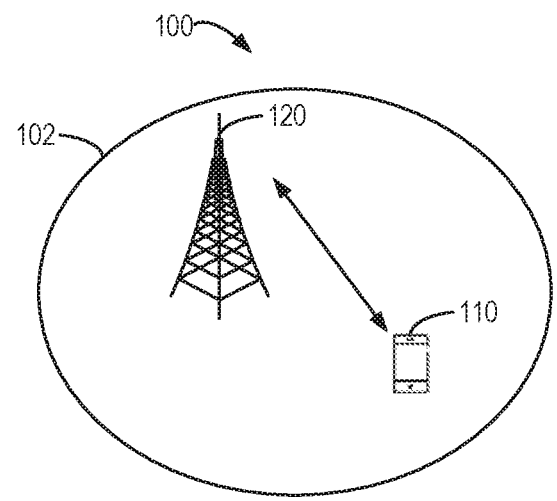
FIG. 1 illustrates an example communication system in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

FIG. 1 shows an example communication system 100 in which example embodiments of the present disclosure can be implemented. The system 100 includes a first device 110 and a second device 120 that can communicate with each other. In this example, the first device 110 is illustrated as a terminal device, and the second device 120 is illustrated as a network device serving the terminal device. Thus, the serving area of the second device 120 is called as a cell 102.

It is to be understood that the number of first and second devices is only for the purpose of illustration without suggesting any limitations. The communication system 100 may include any suitable number of first and second devices adapted for implementing embodiments of the present disclosure. Although not shown, it would be appreciated that one or more additional terminal devices may be located in the cell 102 and served by the second device 120.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In the communication system 100, the first device 110 and the second device 120 can communicate data and control information to each other. In the case that the first device 110 is a terminal device and the second device 120 is a network device, a link from the second device 120 to the first device 110 is referred to as a downlink (DL), while a link from the first device 110 to the second device 120 is referred to as an uplink (UL). In DL, the second device 120 is a transmitting (TX) device (or a transmitter) and the first device 110 is a receiving (RX) device (or a receiver). In UL, the first device 110 is a TX device (or a transmitter) and the second device 120 is a RX device (or a receiver).

Typically, in order to communicate data with the network device 110, the first device 110 may initiate a RA procedure to establish a connection with the second device 120. The RA procedure may be triggered by a number of events, such as an initial access to the second device 120 from an idle status, a connection re-establishment procedure, DL or UL data arrival during the connected status when UL synchronisation status is "non-synchronised," UL data arrival during the connected mode when there are no physical uplink control channel (PUCCH) resources for a schedule requesting (SR) available, SR failure, a request by radio resource control (RRC) upon synchronous reconfiguration (e.g. handover), transition from an RRC inactive status, establishing establish time alignment for a secondary timing advance group (TAG), a request for other system information (SI), a beam failure recovery (BFR), and so on. In some cases, the first device 110 might have to attempt for a number of times to transmit a RA preamble before the second device 120 at the receiving side can successfully detect the RA preamble.

Either contention-free random access (CFRA) or contention-based random access (CBRA) can be employed. CFRA refers to the use of dedicated RA resources while CBRA refers to the use of shared RA resources. CBRA may lead to a situation where multiple terminal devices attempt to access the network through the RA procedure using same RA resource, and therefore requires contention resolution. CFRA is performed based on a specific random access resource assigned by the network device, without contention with other terminal devices.

A RA resource may, for example, include a RA preamble (or a preamble for short) at least, and may probably include a time-frequency resource for message transmission. Depending on messages exchanged between the first device 110 and the second device 120, RA procedures may include slow RA types, some quick RA types, or the like.

An example of the slow RA types includes a four-step RA (or 4-step RA) where the first device 110 transmits a RA preamble in a first message (represented as "MSG1" sometimes) to the second device 120 and following steps are then performed depending on whether the RA procedure is contention-based or contention-free. For example, if a 4-step CBRA (which is contention-based) is performed, at least additional three messages are exchanged between the first device 110 and the second device 120. If a 4-step CFRA (which is contention-free) is performed, the first device 110 may transmit one additional message as a response to MSG1. Example procedures of the 4-step CBRA and 4-step CFRA will be further introduced in the following.

An example of the quick RA types includes a two-step RA (or 2-step RA) where the first device 110 transmits both a RA preamble and payload to the second device 120 in one message (represented as "MSGA" sometimes). The second device 120 generally transmit one response message (represented as "MSGB" sometimes) to MSGA in either the contention-based or CFRA procedure. As such, the time spent for completing the 2-step RA is generally shorter than that for completing the 4-step RA.

The quick RA types have been proposed recently to enable fast access of a first device (for example, a terminal device) to a second device (for example, a network device) in certain cases. It has been agreed that a first device is allowed to select the type of RA (e.g., quick RA or slow RA, or, 2-step RA or 4-step RA) to be performed. On the other hand, a second device may allocate RA resources to the first device for some types of RA and the selection of RA resources by the first device is subject to some restrictions in order to guarantee the performance. It is desired to enhance RA performance in various possible conditions when performing RA.

According to various example embodiments of the present disclosure, there is provided a solution for performing RA. In this solution, a first device is allowed to select a RA type (e.g., 2-step RA or 4-step RA). To perform RA, the first device detects whether a criterion to select a first RA type for performing RA to a second device is met. If the first device is allocated with a CFRA resource for a second RA type, the first device also determines whether it is allowed to use the CFRA resource for the second RA type to perform RA if the criterion to select the first RA type is met. The first device then performs the RA to the second device based on the determination. According to this solution, in the case where a CFRA resource has been allocated for a certain RA type, the first device can conditionally apply the criterion for selection of the RA type and can thus perform RA with improved efficiency. It is possible that the device is enabled to utilize the CFRA resource for a RA type when the criterion requires the device to select the other RA type.

Figure 2:
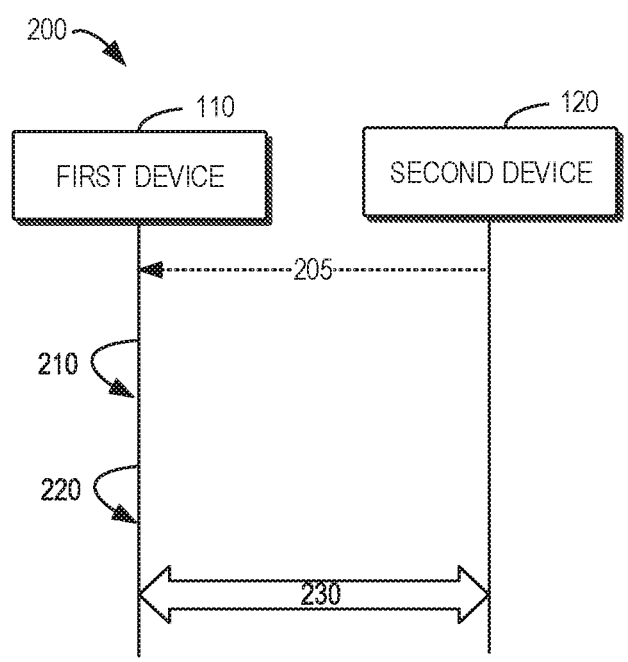
FIG. 2 illustrates a signaling flow for random access according to some example embodiments of the present disclosure.

Example embodiments of the present disclosure will be described in detail below with reference to the accompanying drawings. Reference is now made to FIG. 2, which shows a signaling flow 200 for RA according to some example embodiments of the present disclosure. For the purpose of discussion, the process 200 will be described with reference to FIG. 1. The process 200 may involve the first device 110 and the second device 120 as illustrated in FIG. 1.

In the process 200, the first device 110 detects 210 that a criterion to select a first RA type for performing RA to the second device 120 is met.

There may be a plurality of RA types selectable by the first device 110 and different RA types require different messaging procedures between the first device 110 and the second device 120. The selectable RA types may include one or more relatively quick RA types and one or more relatively slow RA types. A quick RA type generally requires less messages exchanged between the two devices than a slow RA type. An example quick RA type is a so-called 2-step RA, which typically requires two messages exchanged between the first device 110 and the second device 120 to complete the RA. An example slow RA type is a so-called 4-step RA, which typically requires up to four messages exchanged between the first device 110 and the second device 120 to complete the RA in a CBRA mode or fewer messages in a CFRA mode.

In some example embodiments as descried below, the first RA type may be one of the quick RA type and the slow RA type, and the other one of the quick RA type and the slow RA type may be referred to as a "second RA type." In such cases, the first device 110 is allowed to select between the quick and slow RA types for performing RA. In some example embodiments as descried below, the first RA type may be one of the 4-step RA type and the 2-step RA type, and the second RA type is the other one of the 4-step RA type and the 2-step RA type. RA procedures of different types will be introduced in more detail below.

Different RA types may have different performances and thus it would be beneficial to apply an appropriate RA type in different cases. For example, message transmission performance of different RA types (for example, 2-step and 4-step RA types), such as preamble performance (i.e., the probability of missed-detection of RA preambles) may be influenced by RA parameters. Some of the RA parameters are under the control of the second device 120, which means that the second device 120 has the flexibility to configure those parameters as the same or different for different RA types. Examples of such parameters include the preamble format, the number of configured preambles (pool size), the number of users attempting random access (traffic loads), and when applicable, power control parameters (such as preambleReceivedTargetPower and powerRampingStep). At the side of the first device 110, it may apply corresponding criteria to select a RA type for use depending on current communication conditions with the second device 120, in order to achieve expected performance.

The criterion to select a RA type may be based on various factors. In some example embodiments, the criterion may be based on a signal quality achieved by the first device 110 in the cell 102. The signal quality may be determined by measuring a signal received from the second device 120 and the signal quality may include strength of the received signal such as a reference signal received power (RSRP) or a received signal strength indicator (RSSI). The signal quality may alternatively or additionally include a reference signal received quality (RSRQ), a signal noise ratio (SNR), a signal noise interference ratio (SINR), or the like. That is, the overall signal quality of the received signal may be a measure of the signal quality in the whole cell 102. In some example embodiments, the signal quality may be measured in a cell level. For example, the first device 110 may measure one or more beams of the cell 102 and the measurement results (such as the power values) are averaged to derive the cell-level signal quality. The measurement results for the individual beams may be referred to as respective beam-level signal qualities for the beams.

The criterion to select the RA type may be configured according to a signal quality threshold for the signal received from the second device 120, for example, a strength threshold such as a predetermined RSRP threshold for the received signal, and/or other thresholds for other types of signal quality. Such signal quality threshold may be configured by the second device 120. The first device 110 may detect whether the criterion to select the first RA type is met based on the signal quality threshold (e.g., the strength threshold), for example, by comparing the measured signal quality with the signal quality threshold. In some example embodiments where the first device 110 selects between the quick and slow RA types or specifically between the 2-step and 4-step RA types, a high signal quality (such as a RSRP higher than the RSRP threshold) may suggest that the quick RA type (e.g., the 2-step RA type) can be used. Otherwise, a low signal quality (such as the RSRP lower than the RSRP threshold) may suggest that the slow RA type (e.g., the 4-step RA type) can be used.

In some example embodiments, if the first RA type is the slow RA type or specifically the 4-step RA type, the first device 110 determines whether the criterion to select this first RA type by comparing the currently-measured signal quality of the first device 110 with the signal quality threshold, such as the RSRP threshold. If the measured signal quality is lower than the signal quality threshold (for example, the RSRP lower than the RSRP threshold), the first device 110 determines that the criterion to select the first RA type is met. In some further example embodiments, if the first RA type is the quick RA type or specifically the 2-step RA type, the first device 110 determines that the criterion to select the first RA type is met when the measured signal quality exceeds the signal quality threshold.

In the signaling flow 200, the first device 110 also determines 220 whether it is allowed to use a CFRA resource allocated for the second RA type if the criterion to select the first RA type is met.

In performing RA to the second device 120, the second device 120 may allocate one or more CFRA resources for one or more RA types that are potentially selected by the first device 110. Utilizing a CFRA resource, the first device 110 is able to implement CFRA, without contention with other devices. A CFRA resource may include a dedicated RA preamble assigned to the first device 110. In some example embodiments, the CFRA resource may also include a time-frequency resource (referred to as "a first time-frequency resource") for transmission of the dedicated RA preamble.

Generally, a RA preamble is transmitted in a physical random access channel (PRACH). The first time-frequency resource may thus be a PRACH resource. The time-frequency resource may not be specifically allocated via a dynamical resource assignment from the second device 120 but may be implicitly determined, for example, from other configuration information, such as an index of the dedicated RA preamble.

In some example embodiments, if the CFRA resource is allocated to the 2-step RA, which requires both a RA preamble and a payload to be transmitted in one message (i.e., "MSGA"), the CFRA resource may further include a time-frequency resource (referred to as a "second time-frequency resource") for transmission of payload of the first device 110. The payload may be transmitted in a physical uplink shared channel (PUSCH) in some examples. Thus, the second time-frequency resource may be a PUSCH resource.

Typically, a CFRA resource is assigned by the second device 120 for a specific RA type. According to example embodiments, the first device 110 can decide whether to use the CFRA resource allocated to the second RA type if the criteria to select different RA types suggest that the first RA type is to be selected over the second RA type. That is, the criteria for RA type selection can be conditionally applied for actual RA.

The second device 120 may dynamically or semi-dynamically configure whether the first device 110 is allowed to use the CFRA resource allocated to the second RA type if the criterion to select the first RA type is met. As shown in the signaling flow 200, the second device 120 provides 205 indication information for the first device 110. The indication information indicates whether the first device 110 is allowed to use a CFRA resource allocated for a second RA type if the criterion to select the first RA type is met.

The indication information may be provided in an explicit manner. In an example embodiment, the indication information may be provided to the first device 110 by transmitting explicit configuration information to indicate whether the first device 110 is allowed to use a CFRA resource allocated for a second RA type if the criterion to select the first RA type is met. The configuration information may be comprised in a handover (HO) command or in a BFR configuration message transmitted from the second device 120 to the first device 110. For example, the configuration information may indicate whether the first device 110 is allowed to use one or more CFRA resources allocated for the 2-step RA type if the criterion to select the 4-step RA type is met. Alternatively, or in addition, the configuration information may also indicate whether the first device 110 is allowed to use one or more CFRA resources allocated for the 4-step RA type if the criterion to select the 2-step RA type is met. It would be appreciated that the explicit configuration information may be transmitted to the first device 110 in any other commands or messages, or in a dedicated configuration message.

As an alternative, the indication information may be provided in an implicit manner. The first device 110 may determine implicitly from a RA occasion (RO) shared between the first and second RA types whether the first device 110 is allowed to use the CFRA resource allocated for the second RA type. A RO is also referred to a PRACH occasion or a transmission occasion for RA, which may be defined by one or more time and/or frequencies. A shared RO indicates that both the first and second RA types can be performed in this RO. When allocating the CFRA resource for the first device 110, the second device 120 may allocate a dedicated RA preamble for the RO shared between the first and second RA types. Upon receipt of the allocation of the CFRA resource, the first device 110 may implicitly determine that it is allowed to use the CFRA resource if it finds that the dedicated RA preamble of the second RA type is allocated for the RO shared with the first RA type.

It would be appreciated that as an alternative, the first device 110 may be configured semi-statically with the configuration of whether it is allowed to use a CFRA resource for one RA type if a criterion to select the other RA type is met. The semi-static configuration may be signaled by the second device 120 to the first device 110, for example, via RRC signaling. In a further example embodiment, the first device 110 may be specified with the configuration of whether it is allowed to use a CFRA resource for one RA type if a criterion to select the other RA type is met, without receiving the configuration from the second device 120 during operation.

It would also be appreciated that the detection 210 and the determination 220 may be performed in various different orders. For example, the determination 220 may be performed before, after, or in parallel with the detection 210.

Still referring to FIG. 2, the first device 110 performs 230 the RA to the second device 120 based on the determination 220.

Depending on whether the first device 110 is allowed to use the CFRA resource allocated for the second RA type if a criterion to select the first RA type is met, the first device 110 may perform the RA in different ways. In some example embodiments, the first device 110 may take other factors (e.g., availability of a suitable beam for CFRA) into account when performing the RA. In an example embodiment, if the first device is allowed to use the CFRA resource allocated for the second RA type, the first device 110 may determine availability of a beam associated with the CFRA resource for performing the RA.

The availability of the beam may be determined based on a beam-level signal quality threshold (e.g., a beam-level strength threshold such as a beam-level RSRP threshold) for a signal received from the second device 110 on the beam. More specifically, availability of a beam may be determined by comparing a beam-level signal quality of a signal received from the second device 120 on that beam with the beam-level signal quality threshold (such as the beam-level RSRP threshold). The beam-level signal quality of the received signal may be detected based on a measurement on a synchronization signal and a channel broadcast channel block (SSB), a channel state information reference signal (CSI-RS), and/or the like. In some example embodiments, the beam-level signal quality threshold for determining availability of a beam may be different from the one used to determine whether a criterion for selecting a certain RA type can be met. In some example embodiments, the beam-level signal quality threshold may be configured by the second device 120. For example, the beam-level RSRP threshold used may be configured by the second device 120 via specific parameters, such as rsrp-ThresholdSSB or rsrp-ThresholdCSI-RS if the beam-level RSRP of the received signal is measured on SSB or CSI-RS. It would be appreciated that other beam-level signal qualities may be applied and other configurable parameters may be signalled from the second device 120 to configure the corresponding thresholds.

In a further example embodiment, the first device 110 may further determine whether it is allocated with one or more further CFRA resources for the first RA type and then take suitability for performing RA using one of the further CFRA resources (or availability of a beam associated with one of the one or more further CFRA resources) into account when performing the RA. Some example embodiments will be described below to specifically discuss how the RA is performed by considering one or more of those factors.

Before discussing the RA performed by considering one or more of the above factors, some example RA procedures that are possibly performed between the first and second devices 110, 120 will be briefly introduced with reference to FIG. 3A to FIG. 3D.

Figure 3A:
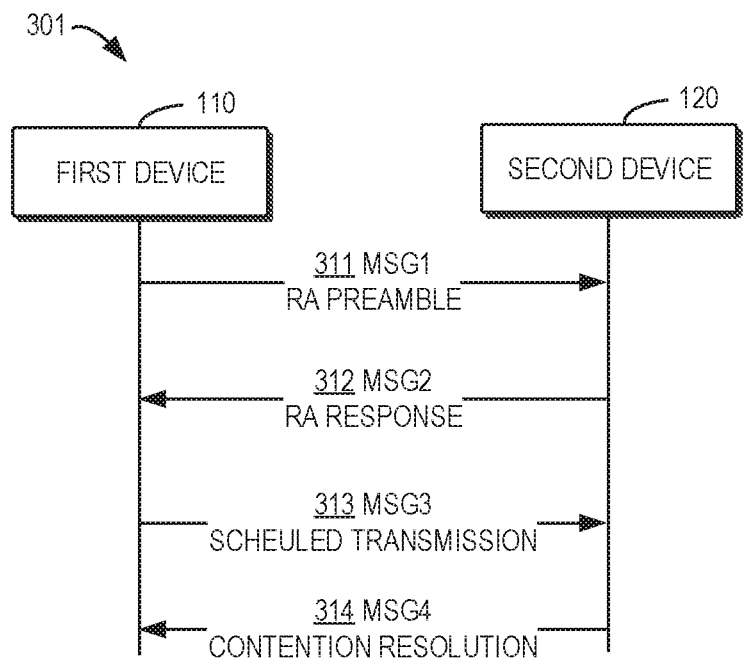
FIGS. 3A-3D illustrate flowcharts of different random access procedures according to some example embodiments of the present disclosure.

FIG. 3A shows a 4-step CBRA procedure 301. In this example, the first device 110 may contend with one or more other devices in transmitting messages to the second device 120 to perform the RA. Specifically, the first device 110 selects and transmits 311 a RA preamble (which may be referred to as "MSG1") to the second device 120. The RA preamble may be transmitted in PRACH. In such CBRA procedure, the RA preamble may randomly be selected from a pool of RA preambles and thus is not dedicated to the first device 110. The second device 120 then transmits 312 a RA response (RAR, which may be referred to as "MSG2") to the RA preamble. Upon receipt of the RA response, the first device 110 transmits 313 a message (which may be referred to as "MSG3") scheduled by the RAR to the second device 120. If the second device 120 receives MSG3 of the first device 110 and determines that the first device 110 has succeeded in the contention, the second device 120 transmits 314, a contention resolution message (which may be referred to as "Msg4") to the first device 110. Upon receipt of such MSG4, the first device 110 may send HARQ feedback (not shown) to the second device 120 and ends the RA procedure.

Figure 3B:
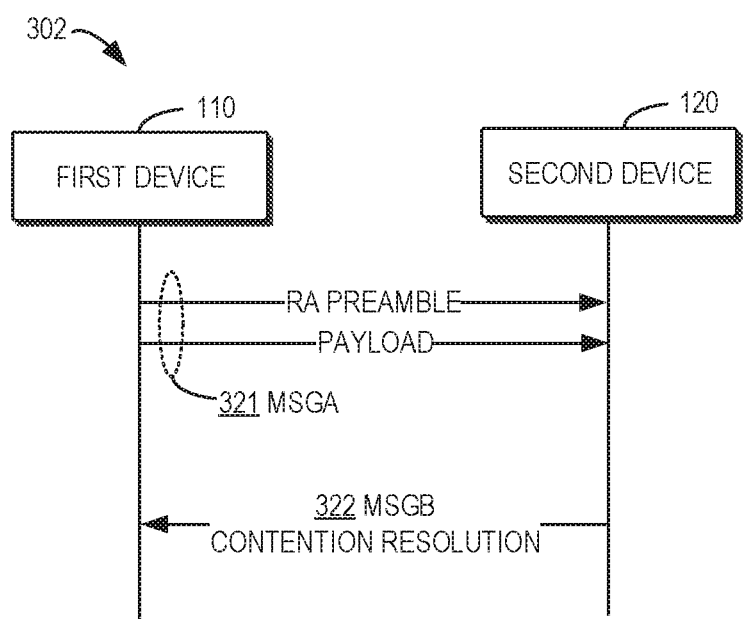

FIG. 3B shows a 2-step CBRA procedure 302, which may potentially achieve quick RA with the second device 120 as compared with the 4-step CBRA procedure 301. As shown, the first device 110 transmits 321 a first message (which may be referred to as "MSGA"), which combines a RA preamble and payload, to the second device 120. In such CBRA procedure, the RA preamble may also randomly be selected from a pool of RA preambles. The RA preamble may be transmitted in PRACH, while the payload may be transmitted in PUSCH. After MSGA transmission, the first device 110 monitors for a response from the second device 120 within a configured window. If the second device 120 receives MSGA of the first device 110 and determines that the first device 110 has succeeded in the contention, the second device 120 transmits 322 a second message (which may be referred to as "MS GB") to the first device 110 to indicate contention resolution. Upon receipt of such MSGB, the first device 110 may send HARQ feedback (not shown) to the second device 120 and ends the RA procedure.

Figure 3C:
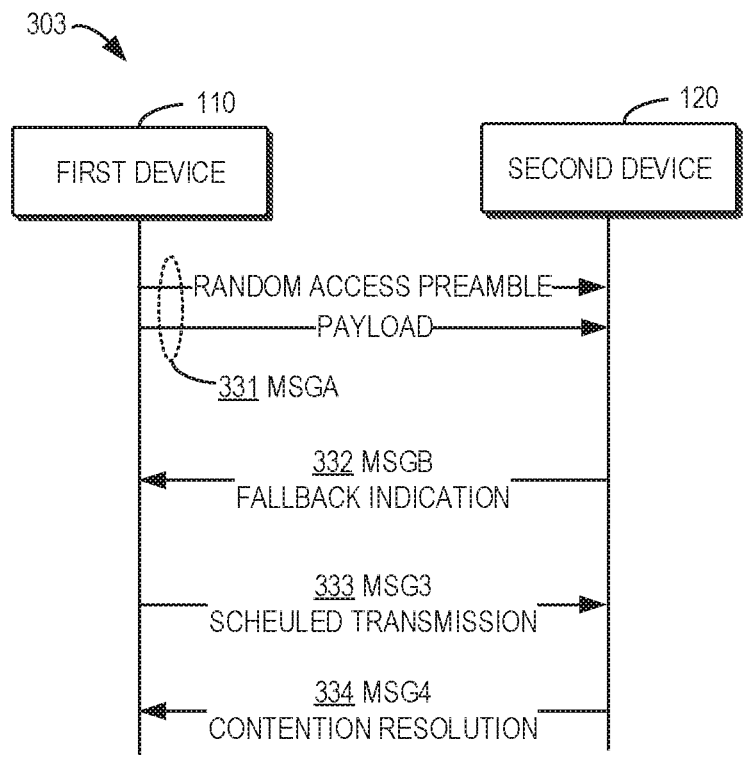

In some cases the on-going 2-step CBRA may fall back to a 4-step CBRA. Such RA procedure is shown in FIG. 3C. In a RA procedure 303 of FIG. 3C, the first device 110 decides to perform the RA of the 2-step RA type and thus transmits 331 MSGA including both a RA preamble and payload to the second device 120. The second device 120, upon receipt of the MSGA, determines (e.g., when it fails to detect the payload part of MSGA) that the first device 110 shall fall back to a 4-step CBRA and thus transmits 332 a fallback indication in MSGB to the first device 110. Upon receipt of the fallback indication, the first device 110 falls back to the 4-step CBRA and continues to transmit 333 scheduled transmission in MSG3 to the second device 120. In some example embodiments, the first device 110 can be further configured to switch to the 4-step CBRA after a number of retries with the 2-step CBRA. If the second device 120 receives MSG3 of the first device 110 and determines that the first device 110 has succeeded in the contention, the second device 120 transmits 334, a contention resolution (which may be referred to as "Msg4") to the first device 110. Upon receipt of such MSG4, the first device 110 may send HARQ feedback (not shown) to the second device 120 and ends the RA procedure.

Figure 3D:
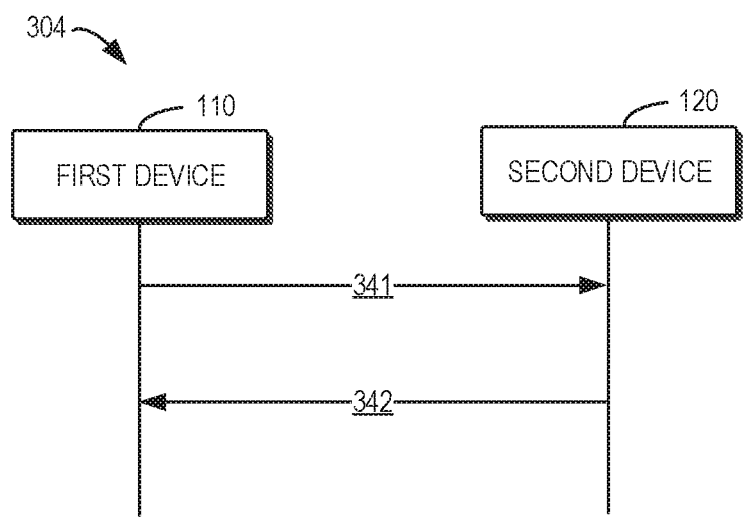

In the case that the first device 110 is allocated with a CFRA resource and the CFRA resource is available for use, the first device 110 can perform CFRA to the second device 120 as shown in a CFRA procedure 304 in FIG. 3D. In the CFRA procedure 304, the second device 120 transmits assignment of the CFRA resource to the first device 110 (not shown). With the assigned resource, the first device 110 transmits 341 a first message to the second device 120 using the allocated CFRA resource. If the CFRA is of a 4-step RA type, the first message includes a dedicated RA preamble (i.e., MSG1), for example, transmitted using the allocated time-frequency resource such as in PRACH. If the CFRA is of a 2-step RA type, the first message includes a dedicated RA preamble and payload of the first device 110 (i.e., MSGA) transmitted using the allocated time-frequency resources. The second device 120 can receive the first message and transmit 342 a second message as a response to the first message. If the CFRA is of a 4-step RA type, the second message may include a RAR (i.e., MSG2). If the CFRA is of a 2-step RA type, the second message may include a response to MSGA, similar as MSGB.

Some example RA procedures based on different RA types and resource allocations have been discussed above. In some example embodiments, as mentioned above, the first device 110 performs the RA to the second device 120 based on a determination of whether it is allowed to use the CFRA resource allocated for a second RA type if a criterion to select a first RA type is met, and probably based on one or more other factors, which will be described in detail.

In some example embodiments, if the CFRA resource allocated for a certain RA type (for example, a 2-step RA type) includes a dedicated RA preamble for this RA type as well as time-frequency resources for transmission of the dedicated RA preamble and payload of the first device 110, in the case that the first device 110 determines that it is allowed to use that allocated CFRA resource for the RA type but the criterion to select another RA type (for example, the 4-step RA type) is met, the first device 110 may perform CFRA by transmitting the dedicated RA preamble using the corresponding time-frequency resource without transmitting the payload using the allocated time-frequency resource. In other words, the first device 110 transmits MSGA in the 2-step RA type which includes only a RA preamble without payload. This is advantageous because the transmission of the payload may not succeed considering that the signal quality is lower than the signal quality threshold. However, the RA preamble performances of the 2-step RA type and 4-step RA type may be comparable in such condition. In such case, transmitting the preamble only may help reduce power consumption of the first device 110, since a transmission of the payload part may not succeed when the 4-step RA is selected by the first device 110 (e.g., due to the fact that RSRP is lower than a preconfigured threshold). Further, transmitting the dedicated RA preamble only would leave the second device 120 the freedom to provide the transport block (TB) size for the subsequent UL grant of any size; that is, the UL grant may not be dependent on the TB size of the payload to be transmitted in MSGA, which is the one it allocated in the configuration of the CFRA resource. Note that though only the dedicated RA preamble for the 2-step RA type is transmitted by the first device 110, from the perspective of the second device 120, it still assumes that the first device 110 performs the RA of the 2-step RA type, since it might not have full information about whether the first device's RSRP status is good enough for the 2-step RA.

Such embodiments enable the first device to make use of an already configured 2-step RA CFRA resource even when its RSRP status suggests a 4-step RA type, leading to increased probability of success of the RA, faster RA and improved RA resource efficiency.

In some example embodiments, the CFRA resource may be allocated on a beam basis. Thus, the CFRA resource that has been allocated for the second RA type may be dedicated for transmission on one or more specific beam and not all the beams of the first device 110 are allocated with CFRA resource. In this case, if the first device 110 is allowed to use the CFRA resource for the second RA type when the criterion to select the first RA type is met, the first device 110 may determine availability of the specific beam for transmission and decide how the RA is performed based on the determined availability of the specific beam.

The availability of the specific beam may be determined by comparing a beam-level signal quality achieved by the first device 110 on that specific beam with a signal quality threshold. The signal quality threshold may be different from the one used to determine whether a criterion to select a certain RA type is met. The beam-level signal quality may be determined by measuring beam-level strength of a signal received from the second device 120 on the specific beam, such as RSRP, RSSI, RSRP, SNR, SINR, or the like. That is, the beam-level strength of the received signal may be a measure of the beam-level signal quality on that specific beam. If the first device 110 determines that the beam-level signal quality exceeds the corresponding signal quality threshold (for example, the RSRP exceeds a RSRP threshold), it may determine that that beam is available for transmission. Otherwise, if the beam-level signal quality is below the corresponding signal quality threshold, the first device 110 determines that the beam is unavailable for transmission. In the case where the CFRA for the second RA type is allocated to be dedicated for transmission on one or more specific beams, the first device 110 may check the availability of each of the respective beams.

If the first device 110 determines that the specific beam(s) is available for transmission, it may perform CFRA of the second RA type using the CFRA resource. In other cases, if the first device 110 determines that the specific beam(s) is unavailable for transmission, it may perform CBRA of the first RA type, especially when the first device 110 is not allocated with any CFRA resource for the first RA type. That is, the first device 110 prioritizes the allocated CFRA resource although the RA type selection result based on the predetermined criterion may suggest a different RA type. As such, the first device 110 has a higher probability to perform CFRA which may reduce the time spent for successful RA. Only when the CFRA resource is not allowed to use or is unavailable for transmission, the first device 110 may preform CBRA of the first RA type selected based on, e.g., the signal quality.

As an example, if the first device 110 is allocated with a CFRA resource for a 2-step RA type that is dedicated for a specific beam and is also allowed to use that CFRA resource even if the criterion to select the 4-step RA type for CBRA is met, the first device 110 may use the allocated CFRA resource to perform the CFRA of the 2-step RA type after determining that the beam is available for transmission. In other cases, if the beam is unavailable, the first device 110 may perform CBRA of the 4-step RA type, especially when the first device 110 is not allocated with any other CFRA resource, e.g., a CFRA resource for the 4-step RA type.

As another example, if the first device 110 is allocated with a CFRA resource for a 4-step RA type that is dedicated to a specific beam and is allowed to use that CFRA resource even if the criterion to select the 2-step RA type for CBRA is met, the first device 110 may also use the allocated CFRA resource to perform the CFRA of the 4-step RA type after determining that the beam is available for transmission. Otherwise, if the beam is unavailable, the first device 110 may perform CBRA of the 2-step RA type when the first device 110 is not allocated with any other CFRA resource, e.g., a CFRA resource for the 2-step RA type.

In some example embodiments, if the first device 110 is allocated with the CFRA resource for the second RA type (a 2-step RA type or a 4-step RA type), the first device 110 may ignore the RA type selection result for CBRA but will always perform RA of the second RA type. That is, the RA may also be of the type for which a CFRA resource is allocated. The RA may be contention-free if the beam associated with the CFRA resource is available for transmission, or may be contention-based if the beam is unavailable. For example, if the first device 110 is allocated with a CFRA resource for the 4-step RA type, the first device 110 may always perform RA of the 4-step RA type, no matter whether the criterion to select the first RA type or the criterion to select the second RA type is met.

In some cases, in addition to the CFRA resource for the second RA type, the first device 110 may be allocated with a further CFRA resource for the first RA type. In such cases, if the criterion to select the first RA type is met and the first device 110 is also allowed to use the CFRA resource for the second RA type even when the criterion to select the first RA type is met, the first device 110 may perform the RA by prioritizing the CFRA resource of the first RA type over the CFRA resource of the second RA type. For example, it is assumed that the first device 110 is allocated with CFRA resources for both the 2-step RA type and the 4-step RA type. If the criterion to select the 4-step RA type is met, the first device 110 may prioritize the CFRA resource for the 4-step RA type over the other CFRA resource. Similarly, if the criterion to select the 2-step RA type is met, the first device 110 may prioritize the CFRA resource for the 2-step RA type.

In some example embodiments, the CFRA resources for the two RA types may be dedicated for transmission on different beams. Specifically, the CFRA resource for the first RA type is associated with one or more first beams while the CFRA resource for the second RA type is associated with one or more second beams which are different from the first beams. Since the CFRA resource for the first RA type is prioritized, the first device 110 may first determine availability of the first beam(s) for transmission. If the first beam(s) is available for transmission, the first device 110 may perform CFRA of the first RA type using the CFRA resource allocated for this first RA type. If the first beam(s) is not available, the first device 110 may further determine availability of the second beam(s) for transmission. If the second beam(s) is available, the first device 110 may perform CFRA of the second RA type using the CFRA resource. The CFRA of the second RA type may be performed in a similar way as discussed above. If the second beam(s) is also unavailable, the first device 110 may have to perform CBRA of the first RA type as the criterion to select the first RA type is met.

According to the example embodiments of the present disclosure, various rules have been provided for the first device to apply the allocated CFRA resources of different RA types. The first device is enabled to use the CFRA resource allocated for a RA type also when this RA type would otherwise not be selected based on the criteria for RA type selection. At the side of the second device, since the CFRA resource typically includes a RA preamble dedicated for the first device, the second device can always identify the first device based on the received RA preamble regardless of the type of the RA performed. This allows the second device to configure CFRA resources of a certain RA type (especially of the quick RA type or the 2-step RA type) more aggressively, for example, for the first device to perform handover. As such, for the first device which operates at the cell edge where the signal quality is not good enough to select the quick RA type, it is still possible to perform RA of the quick type, such as the 2-step RA.

It would be appreciated that although two RA types have been discussed here, there may be more than two RA types selectable by the first device and their CFRA resource allocation and the criteria for RA type selection may be inconsistent. The first device may apply a similar solution as discussed herein to perform the RA. In determining how the RA is performed, the first device may always consider whether the CFRA resources for one or more RA types are allowed to use in the case a different RA type is supposed to be selected and also consider whether the allocated CFRA resources available for use in transmission on certain beams.

Figure 4:
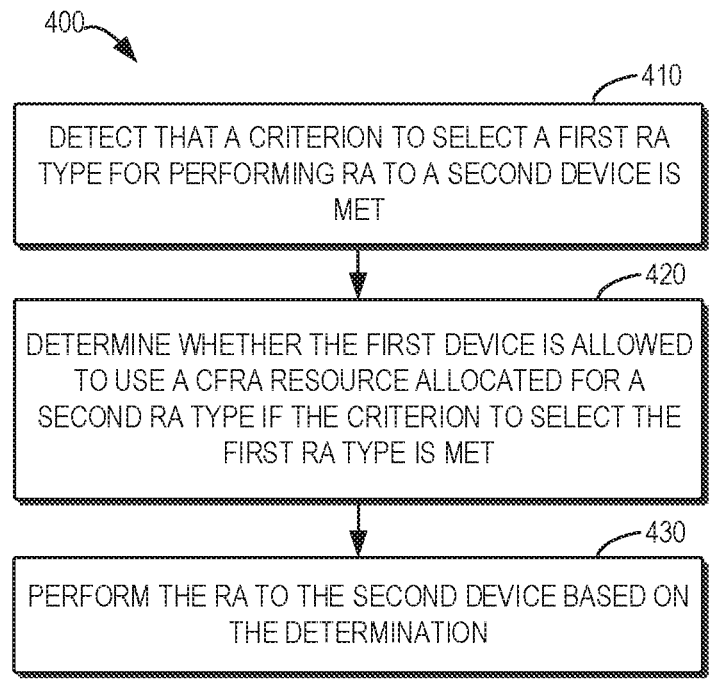
FIG. 4 illustrates a flowchart of a method implemented at a first device according to some example embodiments of the present disclosure.

FIG. 4 shows a flowchart of an example method 400 implemented at a first device in accordance with some example embodiments of the present disclosure. For the purpose of discussion, the method 400 will be described from the perspective of the first device 110 with reference to FIG. 1.

At block 410, the first device 110 detects that a criterion to select a first RA type for performing RA to a second device is met. At block 420, the first device 110 determines whether the first device is allowed to use a CFRA resource allocated for a second RA type if the criterion to select the first RA type is met. At block 430, the first device 110 performs the RA to the second device based on the determination.

Method 400 makes it possible for the first device 110 to perform RA using an already allocated CFRA resource for a certain RA type (e.g., 2-step RA) even when the criterion for RA type selection suggests a different RA type (e.g., 4-step RA). By conditionally applying the criterion for RA type selection, RA resource efficiency may be improved, and latency for RA may be reduced.

In some example embodiments, at block 410, the first device 110 may detect that the criterion to select the first RA type is met based on a strength threshold (e.g., a RSRP threshold) for a signal (e.g., a reference signal) received from the second device 120.

In some example embodiments, at block 420, the first device 110 may determine whether the first device 110 is allowed to use the CFRA resource even if the criterion to select the first RA type is met by: receiving, from the second device, configuration information indicating whether the first device 110 is allowed to use the CFRA resource even if the criterion to select the first RA type is met; and determining, based on the configuration information, whether the first device 110 is allowed to use the CFRA resource if the criterion to select the first RA type is met.

In some example embodiments, the first device 110 may receive the configuration information in a HO command or a BFR configuration message from the second device 120. Examples of the configuration information have been described with reference to operation 205 of FIG. 2.

In some example embodiments, the CFRA resource at least comprises a dedicated RA preamble. In some example embodiments, the first device 110 determines whether it is allowed to use the CFRA resource for the second RA type even if the criterion to select the first RA type is met based on whether the dedicated RA preamble is allocated for a RO shared between the first and second RA types. If the dedicated RA preamble is allocated for the shared RO, the first device 110 determines that the first device 110 is allowed to use the CFRA resource even if the criterion to select the first RA type is met.

In some example embodiments, the CFRA resource comprises a dedicated RA preamble, a first time-frequency resource for transmission of the dedicated RA preamble, and a second time-frequency resource for transmission of payload of the first device 110. In some example embodiments, the first device 110 may perform the RA as follows. If the first device 110 determines at block 420 that it is allowed to use the CFRA resource for the second RA type even if the criterion to select the first RA type is met, it performs CFRA of the second RA type by only transmitting the dedicated RA preamble using the first time-frequency resource, i.e., the payload is not transmitted using the second time-frequency resource. This embodiment enables reduction of power consumption of the first device 110.

Figure 5:
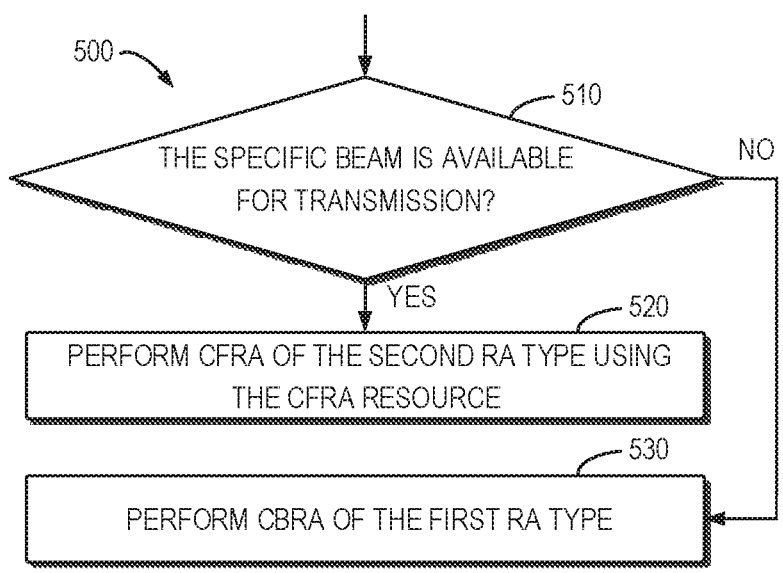
FIG. 5 illustrates a flowchart of a process for random access according to some embodiments of the present disclosure.

In some case, the CFRA resource is dedicated for transmission on a specific beam. If the first device 110 determines at block 420 that the first device 110 is allowed to use the CFRA resource if the criterion to select the first RA type is met, in some example embodiments, the first device 110 may perform the RA based on availability of the specific beam for transmission. FIG. 5 shows a flowchart of a process 500 for RA implemented by the first device 110 in accordance with such example embodiments.

Specifically, at block 510, the first device 110 determines availability of the specific beam for transmission, i.e., determines whether the specific beam is available or unavailable for transmission. The availability of the specific beam may be determined based on a beam-level strength threshold (e.g., a beam-level RSRP threshold) for a signal received from the second device 120 on the specific beam, as described above. The first device 110 then performs the RA based on the determined availability.

If the first device 110 determines at block 510 that the specific beam is available for transmission, at block 520, the first device 110 performs CFRA of the second RA type using the CFRA resource. In this way, since the already-allocated CFRA resource is available for use, the first device 110 is enabled to perform CFRA even if the criterion to select the first RA type is met, which can improve the RA performance. If the first device 110 determines at block 510 that the specific beam is unavailable for transmission, at block 530, the first device 110 performs CBRA of the first RA type.

In some example embodiments, in addition to the CFRA resource allocated for the second RA type, the first device 110 may also be possibly allocated with a further CFRA resource for the first RA type. Thus, in order to perform the RA, the first device 110 may further determine whether the first device 110 is allocated with a further CFRA resource for the first RA type. In some example embodiments, if the first device 110 determines that it is allocated with the CFRA resource for the second RA type and the further CFRA resource for the first RA type both and that it is allowed to use the CFRA resource for the second RA type even if the criterion to select the first RA type is met, the first device 110 may prioritize the further CFRA resource over the CFRA resource in performing the RA.

Figure 6:
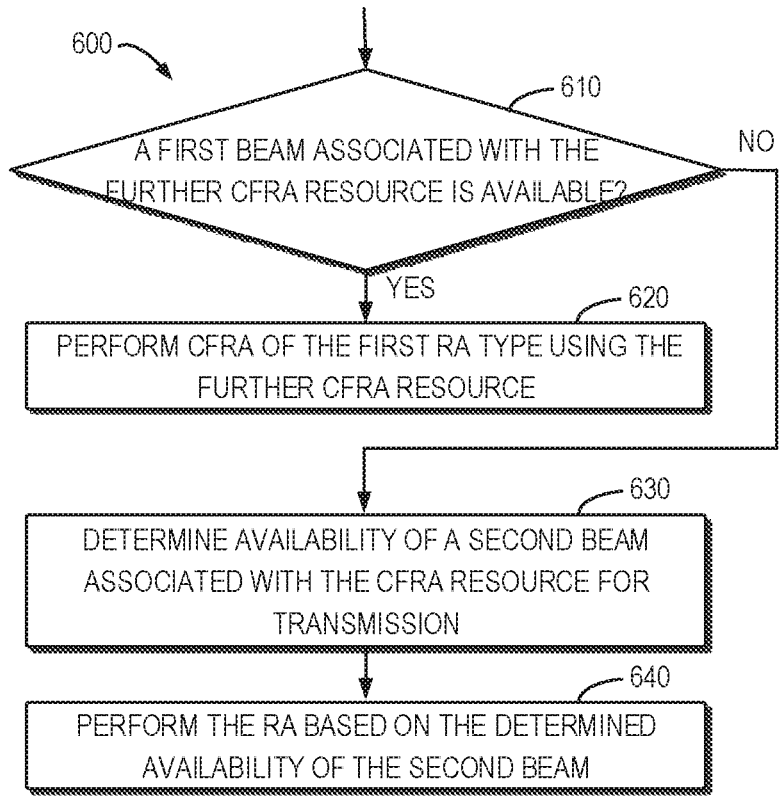
FIG. 6 illustrates a flowchart of a process for random access according to some other embodiments of the present disclosure.

In some example embodiments, the CFRA resource for the second RA type and the further CFRA resource for the first RA type may be dedicated for transmission on different beams. In prioritizing the further CFRA resource over the CFRA resource, the first device 110 may consider availabilities of the respective beams associated with the CFRA resources for the first and second RA types. FIG. 6 shows an example process 600 of performing the RA by prioritizing the further CFRA resource for the first RA type over the CFRA resource for the second RA type.

As shown in FIG. 6, at block 610, the first device 110 determines availability of a first beam associated with the further CFRA resource for transmission, i.e., determines whether the first beam is available or unavailable for transmission. The availability of the first beam may be determined based on a beam-level strength threshold (e.g., a beam-level RSRP threshold) for a signal received from the second device 120 on the first beam, as described above.

If the first device 110 determines at block 610 that the first beam is available for transmission, at block 620, the first device 110 performs CFRA of the first RA type using the further CFRA resource. If the first device 110 determines at block 610 that the first beam is unavailable for transmission, the first device 110 continues to determine, at block 630, availability of a second beam associated with the CFRA resource for transmission, and perform, at block 640, the RA based on the determined availability of the second beam. The availability of the second beam may be similarly determined based on a beam-level strength threshold (e.g., a beam-level RSRP threshold) for a signal received from the second device 120 on the second beam. In this case, the RA may be performed in a similar way as described above with respect to the availability of the beam associated with the CFRA resource for the second RA type. For example, if the second beam is available for transmission, the first device 110 may perform CFRA of the second RA type using the CFRA resource. Otherwise, if the second beam is unavailable for transmission, the first device 110 performs CBRA of the first RA type.

In some example embodiments, the first RA type is one of a quick RA type and a slow RA type, and the second RA type is the other one of the quick RA type and the slow RA type.

In some example embodiments, the first RA type is one of a four-step RA type and a two-step RA type, and the second RA type is the other one of the four-step RA type and the two-step RA type.

In some example embodiments, the first device 110 comprises a terminal device, and the second device 120 comprises a network device.

Figure 7:
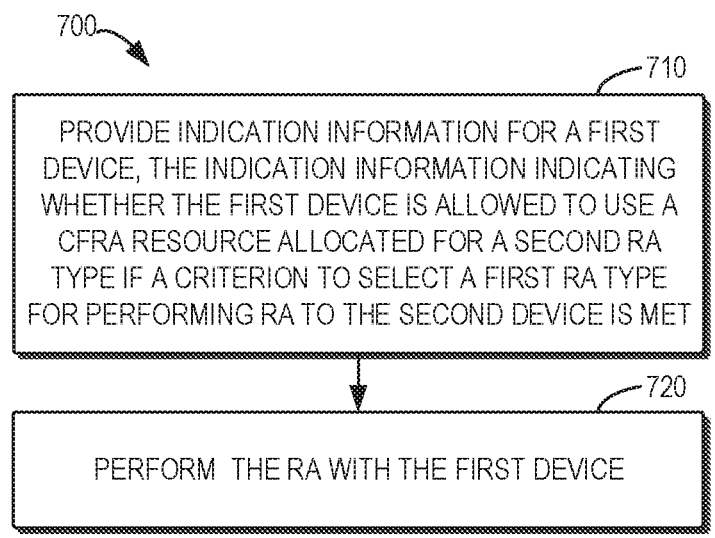
FIG. 7 illustrates a flowchart of a method implemented at a second device according to some other embodiments of the present disclosure.

FIG. 7 shows a flowchart of an example method 700 implemented at a second device in accordance with some example embodiments of the present disclosure. For the purpose of discussion, the method 700 will be described from the perspective of the second device 120 with reference to FIG. 1.

At block 710, the second device 120 provides indication information for the first device 110, the indication information indicating whether the first device 110 is allowed to use a CFRA resource allocated for a second RA type if a criterion to select a first RA type for performing RA to the second device 120 is met. At block 720, the second device 120 performs the RA with the first device 110.

Method 700 allows the second device 120 to have the flexibility to configure whether the first device 110 is allowed to use a CFRA resource allocated for a certain RA type if a criterion to select another RA type is met. As such, the second device 120 is able to configure CFRA resources of the certain RA type (especially of the quick RA type or the 2-step RA type) more aggressively, for example, for the first device 110 to perform handover. The first device 110 thus can conditionally apply the criterion for RA type selection, RA resource efficiency may be improved, and latency for RA may be reduced.

In some example embodiments, at block 710, the second device 120 may provide the indication information by transmitting, to the first device 110, configuration information indicating whether the first device 110 is allowed to use the CFRA resource if the criterion to select the first RA type is met.

In some example embodiments, the configuration information transmitted to the first device 110 may be comprised in a HO command or a BFR configuration message. Examples of the configuration information have been described with reference to operation 205 of FIG. 2.

In some example embodiments, at block 710, the second device 120 may provide the indication information by allocating, to the first device 110, a dedicated RA preamble for a RO shared between the first and second RA types. In this way, by detecting that the dedicated RA preamble is allocated for the shared RO, the first device 110 may determine implicitly that it is allowed to use the CFRA resource even if the criterion to select the first RA type is met.

In some example embodiments, the first RA type is one of a quick RA type and a slow RA type, and the second RA type is the other one of the quick RA type and the slow RA type.

In some example embodiments, the first RA type is one of a four-step RA type and a two-step RA type, and the second RA type is the other one of the four-step RA type and the two-step RA type.

In some example embodiments, the first device 110 comprises a terminal device, and the second device 120 comprises a network device.

In some example embodiments, a first apparatus capable of performing any of the method 400 (for example, the first device 110) may comprise means for performing the respective steps of the method 400. The means may be implemented in any suitable form. For example, the means may be implemented in a circuitry or software module. The first apparatus may be implemented as or included in the first device 110.

In some example embodiments, the first apparatus comprises means for performing at least the following: detecting that a criterion to select a first RA type for performing RA to a second apparatus is met; determining whether the first apparatus is allowed to use a CFRA resource allocated for a second RA type if the criterion to select the first RA type is met; and performing the RA to the second apparatus based on the determination.

In some example embodiments, the means for detecting that the criterion to select the first RA type is met may include means for detecting, based on a strength threshold for a signal received from the second apparatus, that the criterion to select the first RA type is met.

In some example embodiments, the means for determining whether the first apparatus is allowed to use the CFRA resource if the criterion to select the first RA type is met may include means for receiving, from the second apparatus, configuration information indicating whether the first apparatus is allowed to use the CFRA resource if the criterion to select the first RA type is met and determining, based on the configuration information, whether the first apparatus is allowed to use the CFRA resource if the criterion to select the first RA type is met.

In some example embodiments, the means for receiving the configuration information may include means for receiving, from the second apparatus, a HO command or a BFR configuration message that comprises the configuration information.

In some example embodiments, the CFRA resource at least comprises a dedicated RA preamble. In some example embodiments, the means for determining whether the first apparatus is allowed to use the CFRA resource if the criterion to select the first RA type is met may include means for determining whether the dedicated RA preamble is allocated for a RO shared between the first and second RA types; and in accordance with a determination that the dedicated RA preamble is allocated for the shared RO, determining that the first apparatus is allowed to use the CFRA resource if the criterion to select the first RA type is met.

In some example embodiments, the CFRA resource comprises a dedicated RA preamble, a first time-frequency resource for transmission of the dedicated RA preamble, and a second time-frequency resource for transmission of payload of the first apparatus. In some example embodiments, the means for performing the RA may include means for performing, in accordance with a determination that the first apparatus is allowed to use the CFRA resource if the criterion to select the first RA type is met, CFRA of the second RA type by transmitting the dedicated RA preamble using the first time-frequency resource without transmitting the payload using the second time-frequency resource.

In some example embodiments, the CFRA resource is dedicated for transmission on a specific beam. In some example embodiments, the means for performing the RA may include means for determining availability of the specific beam for transmission, and performing the RA based on the determined availability, in accordance with a determination that the first apparatus is allowed to use the CFRA resource if the criterion to select the first RA type is met.

In some example embodiments, the means for determining the availability of the specific beam for transmission may include means for determining the availability of the specific beam for transmission based on a beam-level strength threshold (e.g., a beam-level RSRP threshold) for a signal received from the second apparatus on the specific beam.

In some example embodiments, the means for performing the RA based on the determined availability may include means for performing, in accordance with a determination that the specific beam is available for transmission, CFRA of the second RA type using the CFRA resource; and performing, in accordance with a determination that the specific beam is unavailable for transmission, CBRA of the first RA type.

In some example embodiments, the means of the first apparatus may be further for determining whether the first apparatus is allocated with a further CFRA resource for the first RA type. In some example embodiments, the means for performing the RA may include means for performing the RA by prioritizing the further CFRA resource over the CFRA resource, in accordance with a determination that the first apparatus is allocated with the further RA resource and a determination that the first apparatus is allowed to use the CFRA resource if the criterion to select the first RA type is met.

In some example embodiments, the means for performing the RA by prioritizing the further CFRA resource over the CFRA resource may include means for determining availability of a first beam associated with the further CFRA resource for transmission; performing, in accordance with a determination that the first beam is available for transmission, CFRA of the first RA type using the further CFRA resource; and in accordance with a determination that the first beam is unavailable for transmission, determining availability of a second beam associated with the CFRA resource for transmission, and performing the RA based on the determined availability of the second beam.

In some example embodiments, the first RA type is one of a quick RA type and a slow RA type, and the second RA type is the other one of the quick RA type and the slow RA type.

In some example embodiments, the first RA type is one of a four-step RA type and a two-step RA type, and the second RA type is the other one of the four-step RA type and the two-step RA type.

In some example embodiments, the first apparatus comprises a terminal device, and the second apparatus comprises a network device.

In some example embodiments, the first apparatus further comprises means for performing other steps in some example embodiments of the method 400. In some example embodiments, the means comprises at least one processor; and at least one memory including computer program code, the at least one memory and computer program code configured to, with the at least one processor, cause the performance of the first apparatus.

In some example embodiments, a second apparatus capable of performing any of the method 500 (for example, the second device 120) may comprise means for performing the respective steps of the method 500. The means may be implemented in any suitable form. For example, the means may be implemented in a circuitry or software module. The second apparatus may be implemented as or included in the second device 120.

In some example embodiments, the second apparatus comprises means for providing indication information for a first apparatus, the indication information indicating whether the first apparatus is allowed to use a CFRA resource allocated for a second RA type if a criterion to select a first RA type for performing RA to the second apparatus is met; and performing the RA with the first apparatus.

In some example embodiments, the means for providing the indication information may include means for transmitting, to the first apparatus, configuration information indicating whether the first apparatus is allowed to use the CFRA resource if the criterion to select the first RA type is met.

In some example embodiments, the means for transmitting the configuration information may include means for transmitting, to the first apparatus, a HO command or a BFR configuration message that comprises the configuration information.

In some example embodiments, the means for providing the indication information may include means for allocating, to the first apparatus, a dedicated RA preamble for a RA occasion shared between the first and second RA types.

In some example embodiments, the first RA type is one of a quick RA type and a slow RA type, and the second RA type is the other one of the quick RA type and the slow RA type.

In some example embodiments, the first RA type is one of a four-step RA type and a two-step RA type, and the second RA type is the other one of the four-step RA type and the two-step RA type.

In some example embodiments, the first apparatus comprises a terminal device, and the second apparatus comprises a network device.

In some example embodiments, the second apparatus further comprises means for performing other steps in some example embodiments of the method 500. In some example embodiments, the means comprises at least one processor; and at least one memory including computer program code, the at least one memory and computer program code configured to, with the at least one processor, cause the performance of the second apparatus.

Figure 8:
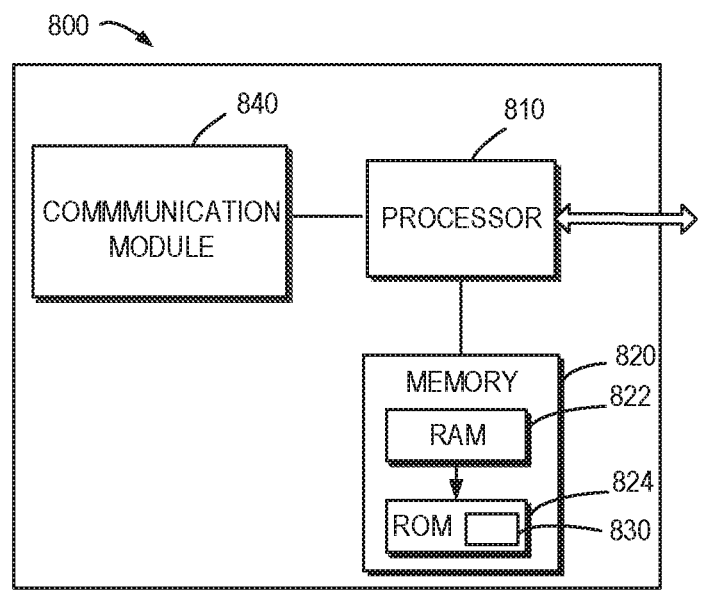
FIG. 8 illustrates a simplified block diagram of an apparatus that is suitable for implementing example embodiments of the present disclosure.

FIG. 8 is a simplified block diagram of a device 800 that is suitable for implementing example embodiments of the present disclosure. The device 800 may be provided to implement the communication device, for example the first device 110 or the second device 120 as shown in FIG. 1. As shown, the device 800 includes one or more processors 810, one or more memories 820 coupled to the processor 810, and one or more communication modules 840 coupled to the processor 810.

The communication module 840 is for bidirectional communications. The communication module 840 has at least one antenna to facilitate communication. The communication interface may represent any interface that is necessary for communication with other network elements.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the memory, e.g., ROM 824. The processor 810 may perform any suitable actions and processing by loading the program 830 into the RAM 822.

The example embodiments of the present disclosure may be implemented by means of the program 830 so that the device 800 may perform any process of the disclosure as discussed with reference to FIGS. 2 to 7. The example embodiments of the present disclosure may also be implemented by hardware or by a combination of software and hardware.

Figure 9:
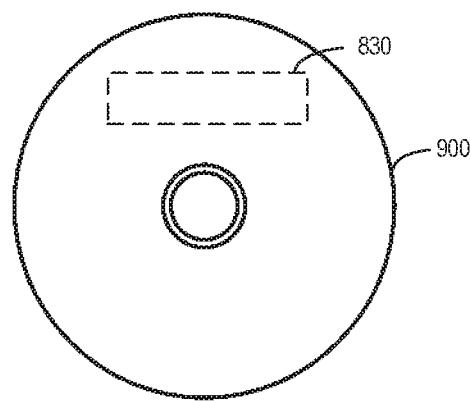
FIG. 9 illustrates a block diagram of an example computer readable medium in accordance with some example embodiments of the present disclosure.

In some example embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and the like. FIG. 9 shows an example of the computer readable medium 900 in form of CD or DVD. The computer readable medium has the program 830 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out any of the methods as described above with reference to FIGS. 2 to 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
at least one processor; and
at least one non-transitory memory including computer program code; wherein the at least one non-transitory memory and the computer program code are configured to, with the at least one processor, cause the first device to:
detect based on at least a strength threshold for a signal received from a second device that a criterion to select a first random access type for performing random access to the second device is met wherein the first random access type is one of a four-step random access type or a two-step random access type;
determine whether the first device is allowed to use a contention-free random access resource allocated for a second random access type, wherein the second random access type is another of the four-step random access type or the two-step random access type; and
perform the random access to the second device based on the determination and conditionally based on the detection.

2. The device of claim 1, wherein the at least one non-transitory memory and the computer program code are further configured to, with the at least one processor, cause the first device to determine whether the first device is allowed to use the contention-free random access resource by:
receiving, from the second device, configuration information indicating whether the first device is allowed to use the contention-free random access resource; and
determining, based on the configuration information, whether the first device is allowed to use the contention-free random access resource.

3. The device of claim 1, wherein the contention-free random access resource at least comprises a dedicated random access preamble, and wherein the at least one non-transitory memory and the computer program code are further configured to, with the at least one processor, cause the first device to determine whether the first device is allowed to use the contention-free random access resource by:
determining whether the dedicated random access preamble is allocated for a random access occasion shared between the first and second random access types; and
in accordance with a determination that the dedicated random access preamble is allocated for the shared random access occasion, determining that the first device is allowed to use the contention-free random access resource.

4. The device of claim 1, wherein the contention-free random access resource comprises a dedicated random access preamble, a first time-frequency resource for transmission of the dedicated random access preamble, and a second time-frequency resource for transmission of payload of the first device, and
wherein the at least one non-transitory memory and the computer program code are further configured to, with the at least one processor, cause the first device to perform the random access by:
in accordance with a determination that the first device is allowed to use the contention-free random access resource, performing a contention-free random access of the second random access type by transmitting the dedicated random access preamble using the first time-frequency resource without transmitting the payload using the second time-frequency resource.

5. The device of claim 1, wherein the contention-free random access resource is dedicated for transmission on a specific beam, and wherein the at least one non-transitory memory and the computer program code are further configured to, with the at least one processor, cause the first device to perform the random access by:
in accordance with a determination that the first device is allowed to use the contention-free random access resource, determining availability of the specific beam for transmission; and
if the specific beam is available for transmission, performing contention-free random access of the second random access type using the contention-free random access resource; and
if the specific beam is unavailable for transmission, performing a contention-based random access of the first random access type.

6. The device of claim 5, wherein the at least one non-transitory memory and the computer program code are further configured to, with the at least one processor, cause the first device to:
determine the availability of the specific beam for transmission based on a beam-level strength threshold for a signal received from the second device on the specific beam.

7. The device of claim 1, wherein the at least one non-transitory memory and the computer program code are configured to, with the at least one processor, further cause the first device to:
determine whether the first device is allocated with a further contention-free random access resource for the first random access type, and
wherein the at least one non-transitory memory and the computer program code are further configured to, with the at least one processor, cause the first device to perform the random access by:
prioritizing the further contention-free random access resource over the contention-free random access resource, in accordance with a determination that the first device is allocated with the further random access resource and a determination that the first device is allowed to use the contention-free random access resource.

8. The device of claim 7, wherein the at least one non-transitory memory and the computer program code are configured to, with the at least one processor, cause the first device to perform the random access by prioritizing the further contention-free random access resource over the contention-free random access resource by:
   determining availability of a first beam associated with the further contention-free random access resource for transmission; and
   if the first beam is available for transmission, performing contention-free random access of the first random access type using the further contention-free random access resource; and
   if the first beam is unavailable for transmission,
      determining availability of a second beam associated with the contention-free random access resource for transmission, and
      performing the random access based on the determined availability of the second beam.

9. A method comprising:
   detecting, at a first device and based on at least a strength threshold for a signal received from a second device, that a criterion to select a first random access type for performing random access to the second device is met, wherein the first random access type is one of a four-step random access type or a two-step random access type;
   determining whether the first device is allowed to use a contention-free random access resource allocated for a second random access type, wherein the second random access type is another of the four-step random access type or the two-step random access type; and
   performing the random access to the second device based on the determination and conditionally based on the detection.

10. The method of claim 9, wherein determining whether the first device is allowed to use the contention-free random access resource comprises:
   receiving, from the second device, configuration information indicating whether the first device is allowed to use the contention-free random access resource; and
   determining, based on the configuration information, whether the first device is allowed to use the contention-free random access resource.

11. The method of claim 9, wherein the contention-free random access resource at least comprises a dedicated random access preamble, and wherein determining whether the first device is allowed to use the contention-free random access resource comprises:
   determining whether the dedicated random access preamble is allocated for a random access occasion shared between the first and second random access types; and
   in accordance with a determination that the dedicated random access preamble is allocated for the shared random access occasion, determining that the first device is allowed to use the contention-free random access resource.

12. The method of claim 9, wherein the contention-free random access resource comprises a dedicated random access preamble, a first time-frequency resource for transmission of the dedicated random access preamble, and a second time-frequency resource for transmission of payload of the first device, and
   wherein performing the random access comprises: in accordance with a determination that the first device is allowed to use the contention-free random access resource, performing contention-free random access of the second random access type by transmitting the dedicated random access preamble using the first time-frequency resource without transmitting the payload using the second time-frequency resource.

13. The method of claim 9, wherein the contention-free random access resource is dedicated for transmission on a specific beam, and
   wherein performing the random access comprises:
      in accordance with a determination that the first device is allowed to use the contention-free random access resource, determining availability of the specific beam for transmission, and
      if the specific beam is available for transmission, performing a contention-free random access of the second random access type using the contention-free random access resource, and
      if the specific beam is unavailable for transmission, performing a contention-based random access of the first random access type.

14. The method of claim 13, wherein determining the availability of the specific beam for transmission comprises: determining the availability of the specific beam for transmission based on a beam-level strength threshold for a signal received from the second device on the specific beam.

15. The method of claim 9, further comprising:
   determining whether the first device is allocated with a further contention-free random access resource for the first random access type, and
   wherein performing the random access comprises:
   performing the random access by prioritizing the further contention-free random access resource over the contention-free random access resource, in accordance with a determination that the first device is allocated with the further random access resource and a determination that the first device is allowed to use the contention-free random access resource.

16. A first device, comprising:
   at least one processor, and
   at least one non-transitory memory including computer program code; wherein the at least one non-transitory memory and the computer program code are configured to, with the at least one processor, cause the first device to:
   receive a configuration on a criterion to select a random access type from a four-step random access type and a two-step random access type for performing random access to a second device, wherein the configuration comprises a strength threshold for a signal from the second device for selecting the random access type,
   determine whether the first device is allocated with a contention free random access resource for a second random access type, wherein the second random access type is one of the four-step random access type or the two-step random access type; and
   in response to determining that the first device is allocated with a contention free random access resource for the second random access type, perform the random access to the second device based on the contention free random access resource and the second random access type, regardless of the criterion to select a random access type for performing random access to a second device.

* * * * *